United States Patent
Bonanno

(10) Patent No.: US 10,299,622 B2
(45) Date of Patent: May 28, 2019

(54) MEMBER TO INCREASE THE THICKNESS AND THE CREAMINESS OF A BEVERAGE IN A BEVERAGE PRODUCING MACHINE

(71) Applicant: ESSSE CAFFE' S.P.A., Anzola Dell'emilia (IT)

(72) Inventor: Roberto Bonanno, Anzola Dell'emilia (IT)

(73) Assignee: ESSSE CAFFE' S.P.A., Anzola Dell'emilia (IT)

( * ) Notice: Subject to any disclaimer, the term of this patent is extended or adjusted under 35 U.S.C. 154(b) by 281 days.

(21) Appl. No.: 15/309,212

(22) PCT Filed: May 8, 2015

(86) PCT No.: PCT/IB2015/053386
§ 371 (c)(1),
(2) Date: Nov. 7, 2016

(87) PCT Pub. No.: WO2015/170294
PCT Pub. Date: Nov. 12, 2015

(65) Prior Publication Data
US 2017/0215633 A1 Aug. 3, 2017

(30) Foreign Application Priority Data
May 8, 2014 (IT) .............................. BO2014A0273

(51) Int. Cl.
*A47J 31/06* (2006.01)
*A47J 31/44* (2006.01)

(52) U.S. Cl.
CPC ................ *A47J 31/4496* (2013.01)

(58) Field of Classification Search
CPC .... A47J 31/4403; A47J 31/4496; A47J 31/60; A47J 31/0605; A47J 31/0663; A47J 31/0668
See application file for complete search history.

(56) References Cited

FOREIGN PATENT DOCUMENTS

| CN | 103747714 A | 4/2014 |
| EP | 2090205 A1 | 8/2009 |
| WO | 1016364 A2 | 7/2000 |
| WO | 2008/120060 A1 | 10/2008 |

OTHER PUBLICATIONS

PCT, International Search Report and Written Opinion, International Application No. PCT/IB2015/053386, 9 pages, dated Sep. 8, 2015.

*Primary Examiner* — Hong T Yoo
(74) *Attorney, Agent, or Firm* — FisherBroyles, LLP; Susan M. Oiler

(57) ABSTRACT

A member with a first body having a through hole along a longitudinal axis thereof along which a beverage is fed from a percolation chamber. A first cup-shaped body is axially aligned under the first body, and a ball, which stops the flow of the beverage under the bias of a spring, is between the hole and the inside of the first cup-shaped body until the beverage reaches a given pressure. A second cup-shaped body houses the lower part of the first body and the first cup-shaped body and internally defines a chamber. A first through window is defined in the first cup-shaped body under the stopping zone of the flow in the hole; and a second through window is defined in the second cup-shaped body, through which contact between the beverage and air is made and is suited to feed the beverage from the chamber outwards.

10 Claims, 3 Drawing Sheets

MEMBER TO INCREASE THE THICKNESS AND THE CREAMINESS OF A BEVERAGE IN A BEVERAGE PRODUCING MACHINE

CROSS-REFERENCE TO RELATED APPLICATIONS

This application is a National Stage filing of International Application No. PCT/IB2015/053386, filed May 8, 2015, which claims priority of Italian Application No. BO2014A000273, filed May 8, 2014, which are incorporated herein by reference in their entireties.

TECHNICAL FIELD

The present invention relates to a member to increase the thickness and the creaminess of a beverage in a beverage producing machine.

The method also relates to a method to prepare a foamy beverage in a beverage producing machine.

BACKGROUND ART

As known, hot beverage producing machines comprise a water tank, a pump which channels the water taken from the tank into a heat exchanger, which takes the water to a predetermined temperature, and a percolation chamber, in which a quantity of infusion product (in powder form, in a pod, in a capsule) is housed. The water from the heat exchanger reaches the percolation chamber and is mixed with the infusion product herein. The beverage thus formed is then fed from the percolation chamber outside the machine.

For given beverages, such as coffee, for example, users prefer a creamy beverage, and in this case some manufacturers of such machines have adopted systems for mixing the beverage exiting from the percolation chamber with pressurized air. However, such systems are complex because they are made directly in the percolation chamber. It is worth noting that the further channels required to make such systems must be periodically subjected to in-depth cleaning to remove scaling which has formed and which could obstruct the channels themselves. Now, it is apparent that either descaling liquids must be used or the percolation chamber must be removed from the machine to then clean it for such cleaning operations. In addition, in the first case, water must be subsequently made to flow at a given pressure in the channels of the aforesaid systems so as to make any residues of the liquids used to remove the scaling flow out. In the second case, either the machine is taken to a maintenance center with consequent costs or there is the risk of breaking some parts of the machine if the users remove the percolation chamber themselves.

DISCLOSURE OF INVENTION

It is the object of the present invention to provide a member to increase the thickness and the creaminess of a beverage in a beverage producing machine which is free from the above-described drawbacks.

It is a further object of the present invention the fact of implementing a method to prepare a foamy beverage in a beverage producing machine.

According to the present invention, a member is provided to increase the thickness and the creaminess of a beverage in a beverage producing machine comprising:

a first body, which develops along a longitudinal axis and has, along said axis (X), a through hole, along which a beverage is fed from a percolation chamber arranged above;

a second body, which develops along said axis under said first body and is supported by said first body;

a third body, which, through elastic return means, is suited to stop the beverage flow between an end section of said hole and the inside of said second body, until the beverage reaches, inside said hole, a pressure value that is suited to overcome said means, thus allowing the beverage to flow towards the inside of said second body, said third body having its largest diameter that is 1 to 20% larger than the diameter of at least one part of the end section of said hole;

a fourth body, which houses, on the inside, the lower part of said first body and said second body, and defines, on the inside, a chamber under said second body;

at least one first through window, which is defined in said second body under the area in which said third body stops the beverage flow, thus preventing it from flowing from said hole to the inside of said second body; and a second through window made in said fourth body, which, during the inflow of the beverage from said percolation chamber, allows the beverage to come into contact with the air and, after the inflow of the beverage from said percolation chamber has ended, is suited to feed the beverage from said chamber towards the outside.

According to the present invention a method is also made to prepare a foamy beverage in a beverage producing machine having a member comprising:

a first body, which develops along a longitudinal axis and has, along said axis, a through hole, along which a beverage is fed from a percolation chamber arranged above;

a second body, which develops along said axis under said first body and is supported by said first body;

a third body, which, through elastic return means, is suited to stop the beverage flow between an end section of said hole and the inside of said second body, until the beverage reaches, inside said hole, a pressure value that is suited to overcome said means, thus allowing the beverage to flow towards the inside of said second body, said third body having its largest diameter that is 1 to 20% larger than the diameter of at least one part of the end section of said hole;

a fourth body, which houses, on the inside, the lower part of said first body and said second body, and defines, on the inside, a chamber under said second body;

at least one first through window, which is defined in said second body under the area in which said third body stops the beverage flow, thus preventing it from flowing from said hole to the inside of said second body; and a second through window made in said fourth body, which, during the inflow of the beverage from said percolation chamber, allows the beverage to come into contact with the air and, after the inflow of the beverage from said percolation chamber has ended, is suited to feed the beverage from said chamber towards the outside;

characterized in that, inside said fourth body, at said second window, a swirling motion of the beverage is created as well as a contact between the beverage and the air on the outside of said second window, which causes the beverage to become foamy.

BRIEF DESCRIPTION OF THE DRAWINGS

For a better understanding of the invention, an embodiment will be described by way of non-limitative example only, with the aid of the accompanying drawings, in which.

BEST MODE FOR CARRYING OUT THE INVENTION

Figure 1:
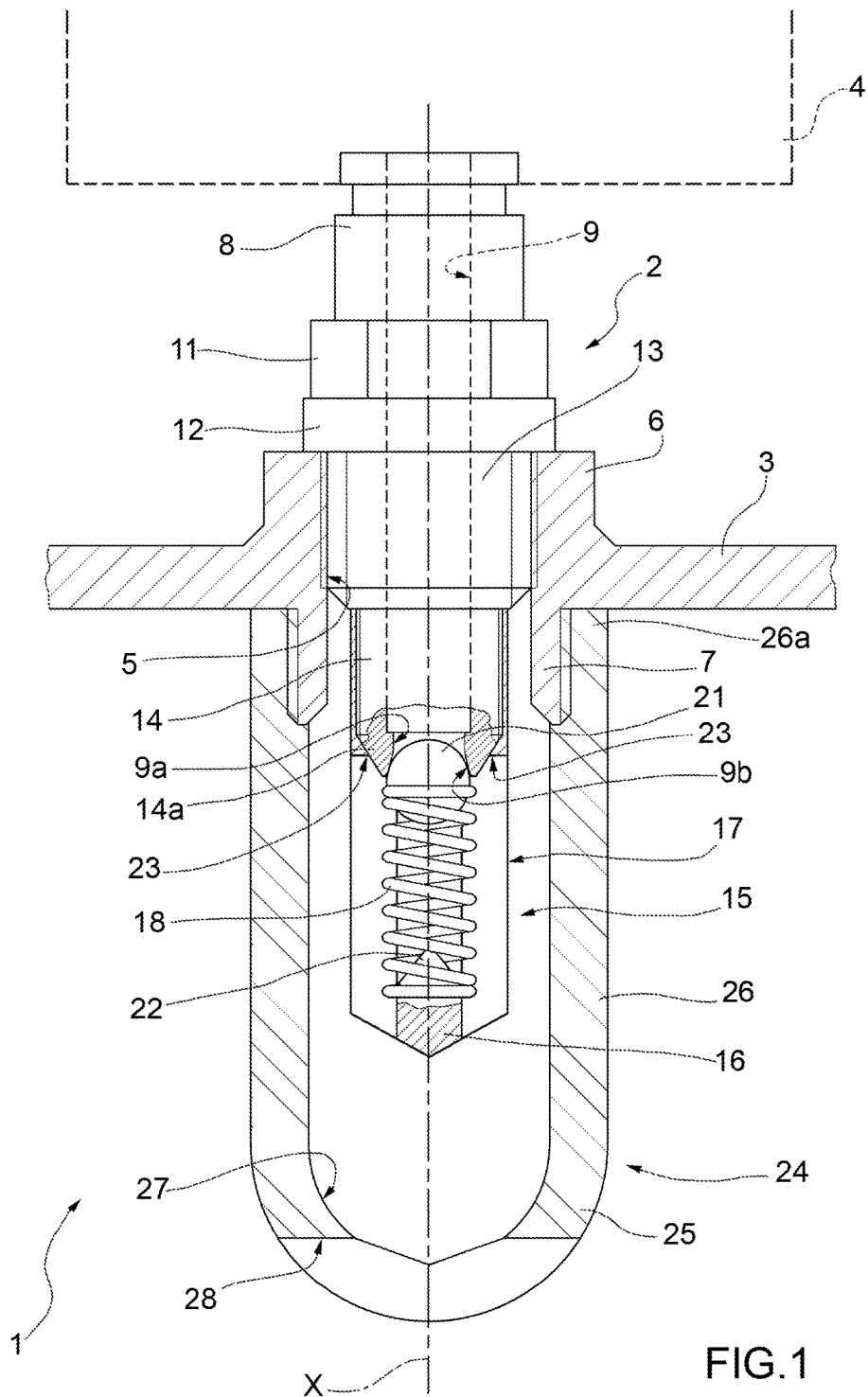
FIG. 1 is a partial section view of a member made according to the dictates of the present invention and having its parts in a resting position.
Figure 2:
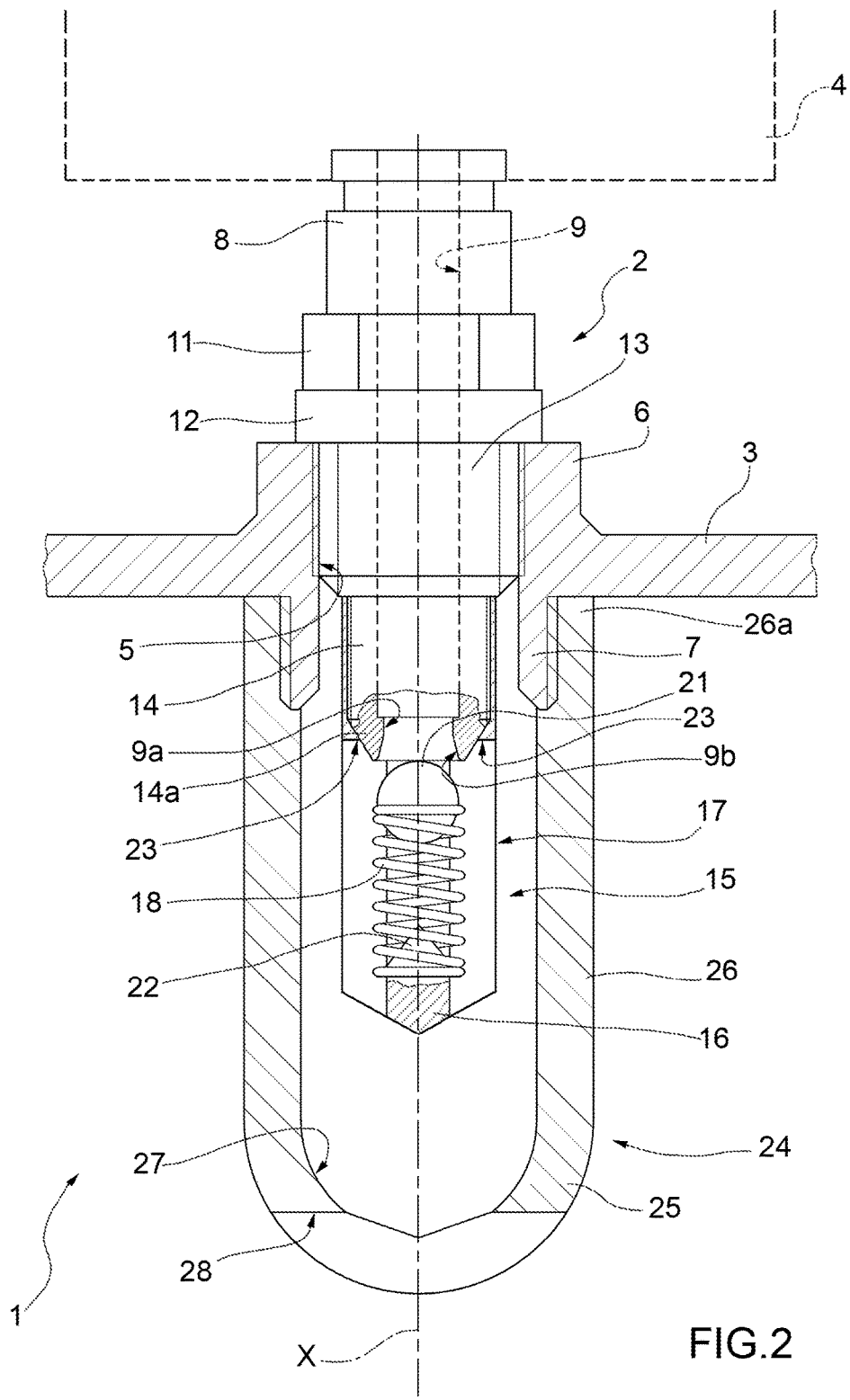
FIG. 2 is a partial section view of the aforesaid member with some parts in a working position.

With reference to FIGS. 1 and 2, numeral 1 indicates as a whole a member to increase the thickness and the creaminess of a beverage in a beverage producing machine (not illustrated because it is known). Member 1 comprises a body 2 carried by a plate 3 and suited to feed the beverage from a percolation chamber 4 (shown by the dashed line) to a container underneath (not shown). Body 2 has a through hole 9 along its entire longitudinal axis X. Plate 3 is defined on a horizontal plane orthogonal to axis X and has a through hole 5 defined along axis X. An internally threaded first sleeve 6 originates upwards and an externally threaded sleeve 7 originates downwards, at said hole 5, from the edge thereof; the sleeves 6 and 7 being coaxial to each other, of equal inner diameter and defined along axis X.

Upwards and downwards, along its longitudinal axis X, body 2 has:

a first portion 8, through which the beverage is fed from the percolation chamber 4 along hole 9;

a second portion 11, which is externally shaped so as to be coupled to a tool (not shown), while it is being mounted on plate 3;

a third portion 12, which, once body 2 has been mounted on plate 3, strikes against the upper edge of sleeve 6;

a fourth portion 13, which is externally threaded and screwed into sleeve 6; and a fifth portion 14, which extends inside sleeve 7 and is externally threaded.

The outer diameter of portion 12 is larger than the inner diameter of sleeve 6 and the outer diameter of portion 14 is smaller than the outer diameter of portion 13.

Member 1 further comprises a cup-shaped body 15 which is carried by portion 14 and after mounting has its longitudinal axis coinciding with axis X. Body 15 is defined by a base wall 16 from which an annular portion extends upwards. The upper part of portion 17 is internally threaded to allow screwing portion 17 onto the outer threaded face of portion 14. A helical spring 18 which extends upwards and along axis X of the base wall 16 is housed in body 15. The upper end of spring 18 supports a ball 21 which is arranged at and inside the lower part of portion 14 substantially closing the passage between hole 9 and the lower part of body 15. A protrusion 22 originates from the base wall 16 of the inner face onto which the lower end of spring 18 is fixed. Portion 14 has a lower end section 14a of thickness tapering towards the end. In particular, hole 9 at section 14a has, from the top down, a first part 9a of constant diameter and smaller than the remaining upper part of hole 9 and a second truncated-cone-shaped part 9b with a diameter which increases to the end of section 14a, while the outer face of section 14a is defined on a converging truncated-cone-shaped surface on axis X. In the resting position (FIG. 1), ball 21 is at part 9b and since such a ball 21 is of larger diameter than the inner diameter of part 9b, a close contact is made, by means of the bias of spring 18, between the lower part of ball 21 and the face which defines part 9b; the contact defines a hydraulic seal. In particular, the diameter of ball 21 is from 11 to 17% larger than the diameter of the part 9a of hole 9 and is larger than the diameter of the end of the part 9b of hole 9.

Figure 3:
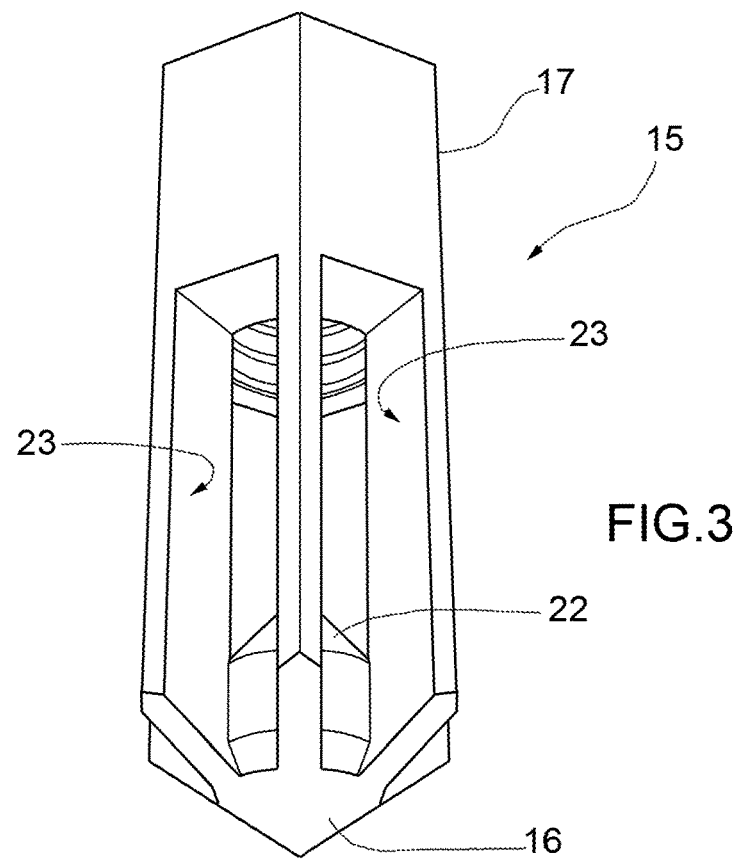
FIG. 3 is a perspective view, on enlarged scale, of a component of the member in FIG. 1.

With reference to FIG. 3, the portion 17 of body 15 is externally prism-shaped and the external face of the base wall 16 is point-shaped. The trough windows 23, one for each face of the outer shape of portion 17, are made in portion 17. The windows 23 extend, parallel to axis X, from the upper internally threaded part of portion 17 to the base wall 17. It is worth noting that the free end of section 14a is substantially at an upper zone of the windows 23.

Figure 4:
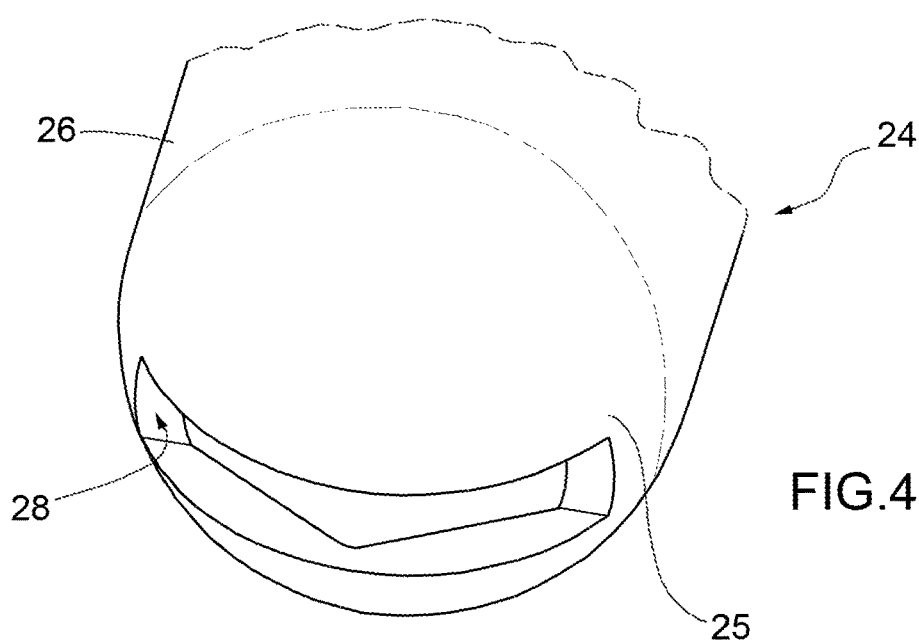
FIG. 4 is a partial perspective view on enlarged scale of a second component of the member in FIG. 1.

Finally, member 1 comprises a further cup-shaped body 24 in which all the components of member 1 located under plate 3 are found. Body 24 has a base wall 25 defined along an axis laying on a circumference arc and an annular side wall 26 of longitudinal axis X. The base wall 25 is at a predetermined distance from the base wall 16 of body 15 so as to define a chamber 27. Furthermore, the base wall 25 has a through window 28 preferably made by means of a cut along a horizontal axis orthogonal to axis X. The side wall 26 has an internally threaded upper end section 26a screwed along sleeve 7 so as to abut against the lower face of plate 3. With reference to FIG. 4, the inner face of the base wall 25 is cone-shaped derived from the reduction of thickness of the wall 25 from the periphery to the middle thereof.

In a different constructive solution, a cone-shaped body may be used instead of ball 21; in all cases, the larger upper diameter of body is from 1 to 20% of the diameter of the part 9a of hole 9 and higher than the larger diameter of the part 9b of hole 9.

In use, the beverage which enters into hole 9 at portion 8 is made in the percolation chamber using infusion product in powder form or in a pod or capsule containing the infusion product. The beverage crosses the entire hole 9 to the section 14a of portion 14 where it stops because the outlet of hole 9 is closed by ball 21. The beverage remains within hole 9 until a pressure value such to push (FIG. 2) ball 21 towards the wall 16 of body 15 against the bias of spring 18 is reached therein. The displacement of ball 21 allows the beverage to exit from hole 9 and take the windows 23 to enter into body 24. Due to the shape of ball 21 and the shape of the part 9b of hole 9, a passage is created between the ball 21 and the part 9b of hole 9 which routes it, once exiting from body 15 through the windows 23, to violently strike against the inner face of the annular wall 26 of body 24. The beverage, or rather the threads into which the beverage is divided by the wall 26, bounce off the outer face from the annular portion 17 of body 15 and so on to chamber 27. The continuous rebounds between the wall 26, the outer face of portion 17 and the inner face of the base wall 16 cause a swirl to be determined in chamber 27 and moreover cause the beverage in chamber 27 to have a lower pressure than it had when it is was confined in hole 9. The creation of the swirl is further promoted by the shape of the inner face of the wall 25. The swirl and the aforesaid pressure drop means that a contact is made between beverage and external air through window 28, contact which causes the foaminess of the beverage. Laboratory tests indicate that the greater foaminess which is created mostly depends on the proportions between the diameter of ball 21 and the diameters of the parts 9a and 9b of hole 9. Then, the increase of foaminess depends on the swirl which is created, which depends on the shape of the windows 23, the shape of the inner face of part 26 and the width of window 28; the width promoting the so-called drop effect which, it is worth noting, is due to the fact that the intermolecular forces between the drops of the beverage and the inner walls of window 28 are higher than the force of gravity to which the drops of the beverage are subjected.

Once that from the percolation chamber 4 no beverage arrives, spring 18 presses ball 21 upwards closing the outlet of hole 9. Furthermore, being no longer fed by further threads of the beverage the swirl in chamber 27 decreases until it stops and the now foamy beverage exits from chamber 27 through window 28 towards a container underneath.

The advantages obtained by implementing the present invention are apparent and numerous.

In particular, a member 1 which does not belong to the percolation chamber and which is therefore simple to construct is made. As can be noted, member 1 consists of a low number of components and is thus cost-effective to produce. Furthermore, member 1 is simple and quick to be mounted (and removed) on the beverage producing machine. This rapid mounting and removing possibility allows a correct, rapid cleaning of member 1, and in particular of the channels of the beverage so as to eliminate the scaling which is normally determined. Finally, it is worth noting that the mixing of the air with the beverage occurs "naturally" because of the shape of the components of member 1 which determine the directions of the channels of the beverage and the swirl in chamber 27.

The invention claimed is:

1. A member to increase the thickness and the creaminess of a beverage in a beverage producing machine comprising:
   a first body, which develops along a longitudinal axis and has, along said axis, a through hole, along which a beverage is fed from a percolation chamber arranged above;
   a second body, which develops along said axis under said first body and is supported by said first body;
   a third body, which, through elastic return means, is suited to stop the beverage flow between an end section of said hole and the inside of said second body, until the beverage reaches, inside said hole, a pressure value that is suited to overcome said means, thus allowing the beverage to flow towards the inside of said second body, said third body having its largest diameter that is 1 to 20% larger than the diameter of at least one part of the end section of said hole;
   a fourth body, which houses, on the inside, the lower part of said first body and said second body, and defines, on the inside, a chamber under said second body; at least one first through window, which is defined in said second body under the area in which said third body stops the beverage flow, thus preventing it from flowing from said hole to the inside of said second body; and
   a second through window made in said fourth body, which, during the inflow of the beverage from said percolation chamber, allows the beverage to come into contact with the air and, after the inflow of the beverage from said percolation chamber has ended, is suited to feed the beverage from said chamber towards the outside.

2. A member according to claim 1, wherein the end section of said hole has a first part, which has a diameter that is 1 to 20% smaller than the largest diameter of said third body, and a second part, which is flared towards the outside and has its largest diameter that is smaller than the largest diameter of said third body.

3. A member according to claim 1, wherein said third body is made up of a sphere.

4. A member according to claim 1, wherein said second body comprises an annular portion and a base wall, and has a plurality of said first windows, which extend parallel to said axis up to said base wall.

5. A member according to claim 4, wherein said second body has an outer shape that is substantially prismatic.

6. A member according to claim 4, wherein said base wall of said second body has an outer shape that is substantially conical.

7. A member according to claim 4, wherein said fourth body has a base wall, which is defined along an axis lying on a circular arc, and an annular lateral wall, which develops along said axis, the base wall being arranged at a predetermined distance from said base wall of said second body, so as to define said chamber, and having said second through window; the inner face of said base wall of the fourth body has a substantially conical shape and said second window obtained along an axis that is orthogonal to said axis.

8. A member according to claim 1, wherein it comprises a plate, which is defined on a horizontal plane orthogonal to said axis and has a second through hole defined along said axis; an internally threaded first sleeve originating upwards and an externally threaded sleeve originating downwards, in correspondence to said second hole, from the edge thereof, said sleeves being coaxial to one another and being defined along said axis, said first sleeve supporting said first body and said second sleeve supporting said fourth body.

9. A member according to claim 8, wherein said first body has, along said longitudinal axis, from the top to the bottom:
   a first portion, through which the beverage is fed from said percolation chamber along said first hole;
   a second portion, which is externally shaped so as to be coupled to a tool, while it is being mounted on said plate,
   a third portion, which, after said first body has been mounted on said plate, strikes against the upper edge of said first sleeve;
   a fourth portion, which is externally threaded and is screwed into said first sleeve, and
   a fifth portion, which extends inside said second sleeve up to the inside of said second body and is externally threaded so that an internally threaded upper portion of said lateral portion of said second body can be screwed on it.

10. A method to prepare a foamy beverage in a beverage producing machine having a member comprising:
    a first body, which develops along a longitudinal axis and has, along said axis, a through hole, along which a beverage is fed from a percolation chamber arranged above;
    a second body, which develops along said axis under said first body and is supported by said first body;
    a third body, which, through elastic return means, is suited to stop the beverage flow between an end section of said hole and the inside of said second body, until the beverage reaches, inside said hole, a pressure value that is suited to overcome said means, thus allowing the beverage to flow towards the inside of said second body, said third body having its largest diameter that is 1 to 20% larger than the diameter of at least one part of the end section of said hole;
    a fourth body, which houses, on the inside, the lower part of said first body and said second body, and defines, on the inside, a chamber under said second body; at least one first through window, which is defined in said second body under the area in which said third body stops the beverage flow, thus preventing it from flowing from said hole to the inside of said second body; and a second through window made in said fourth body, which, during the inflow of the beverage from said percolation chamber, allows the beverage to come into contact with the air and, after the inflow of the beverage from said percolation chamber has ended, is suited to feed the beverage from said chamber towards the outside;

wherein, inside said fourth body, in correspondence to said second window, a swirling motion of the beverage is created as well as a contact between the beverage and the air on the outside of said second window, which causes the beverage to become foamy.

* * * * *